Figure 1:
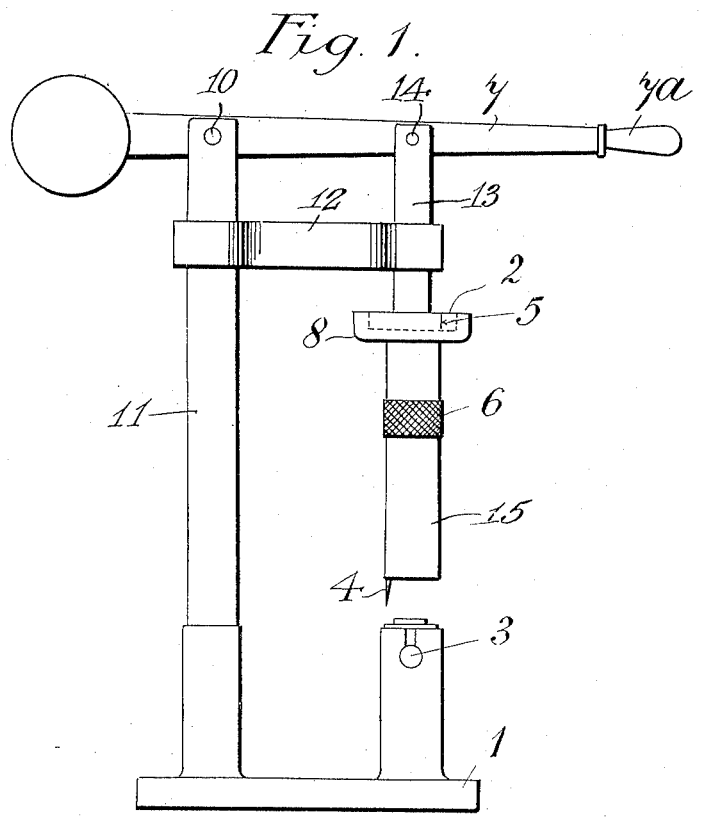

J. H. SUTCLIFFE.
MANUFACTURE OF SPECTACLES.
APPLICATION FILED DEC. 30, 1919.

1,373,032.

Patented Mar. 29, 1921.

John Hamer Sutcliffe,
By Davis & Davis
Attorneys

UNITED STATES PATENT OFFICE.

JOHN HAMER SUTCLIFFE, OF LONDON, ENGLAND.

MANUFACTURE OF SPECTACLES.

1,373,032.     Specification of Letters Patent.     Patented Mar. 29, 1921.

Application filed December 20, 1919. Serial No. 348,422.

*To all whom it may concern:*

Be it known that I, JOHN HAMER SUTCLIFFE, a subject of the King of Great Britain and Ireland, residing at London, England, have invented Improvements in and Pertaining to the Manufacture of Spectacles, of which the following is a specification.

This invention relates to the manufacture of spectacles, and more particularly to spectacles designed for use by soldiers and others engaged in military service, and of the kind comprising circular lenses or glasses and correspondingly circular eyes or apertures therefor in the frame.

In cases where the curvature of such glasses comprises a cylindrical or prismatic component or any component which is liable to rotation in a circular frame, such cylindrical or prismatic combination is set in the frame always at a definite inclination, predetermined by the oculist, to the meridian or to the horizontal through the pupils. It is essential that this position in the frame, of the axis of the cylinder or other lens should not be disturbed by rotation and the object of the present invention is to prevent such rotation. The circular form of the glasses and eyes in a sense facilitates adjustment of the axes of cylindricity to their correct inclination to the horizontal line; but this mobility of the lenses has unfortunately heretofore involved the compensating disadvantage that not only has the accurate adjustment of the axes of cylindricity demanded considerable skill and patience on the part of a skilled operative, but that even when the correct positions have been found, the glasses have been liable to be disturbed therefrom through accident such as shock or merely through careless handling.

Now the present invention has for object to enable the glasses to be inserted instantly in the frames with their cylindrical axes in correct position in accordance with the oculist's prescription, and then to be retained firmly in this position; and according to the invention there is provided a suitable bed-plate, on which the frame of the glasses can be firmly held as by means of a thumb-controlled clamping device, in combination with a suitable appliance such as a punch-like or chisel-like device so mounted as to be rotatable relatively to the bed-plate through any desired angle indicated, as by a pointer on a goniometric scale, the said device or appliance being adapted, when actuated by means of a hand lever or the like, to deform or indent the channel-sectioned rim of the lens aperture, (preferably on one side only) without appreciably weakening the frame.

The position of the axis of cylindricity of a glass or lens being determined by means usually employed for this purpose, the lens, while clamped in this position has its edge correspondingly notched as by means of an emery grinding disk, to an extent sufficient to enable the glass to be inserted in the frame with the notch in engagement with the indentation thereon; whereupon the glass can, if necessary or desirable, be further secured by the insertion of a little quick-setting amalgam or like cement between the notch and the indentation.

Conveniently the bed-plate of the apparatus and the goniometric scale are fixed against rotation the said device and the indicating pointer being rotatable as through a milled band connected with the axis of rotation and adapted to be grasped by one hand while the other hand actuates a lever whereby the indenting device can be operated; but this arrangement may obviously be so modified as to make the bed-plate rotatable, while the indenting device remains stationary.

Figure 2:
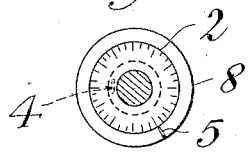

Apparatus of this construction is illustrated in the accompanying drawings wherein Figures 1 and 2 are respectively an elevation of the apparatus and a plan view of its goniometric scale.

In this example of apparatus the bed-plate (1) and the goniometric scale (2) are non-rotatable, the lens frame being held in position on the bed-plate by means of the thumb-controlled clamp (3), while the deforming or indenting device (4) and the pointer or index-mark (5) of the scale are operatively connected together so as to be simultaneously rotatable by the milled band (6) adapted to be grasped by one hand of the operator, while the other hand can grasp the handle (7ª) of the lever (7) to actuate the deforming or indenting device 4. Conveniently, as shown, the index mark 5, is engraved on a collar 8, formed integrally with the band 6, and embracing the scale 2.

The lever 7 is pivotally mounted at 10 upon the upper end of a standard 11 carried by the bed plate 1, and this standard also carries an arm 12 serving as a guide for the non-rotatable rod 13 pivotally connected at 14 with the lever 7 and having rotatably mounted on it the sleeve 15 furnished with the band 6 and collar 8 and carrying the device 4. The scale 2 is carried by the rod 13 and is thus non-rotatable.

The arrangement described is such that the operator upon inspection of the oculist's prescription can instantly adjust the indenting or deforming device 4 in relation to the bed-plate 1 and the lens frame held by the clamp 3 by rotating the milled band 6 into the desired position and firmly holding it in this position with one hand while the other hand is employed to depress the handle 7ª as soon as the index mark 5 has been turned into the prescribed position on the scale 2. The frames can thus be quickly indented to a high degree of accuracy, and the glasses having been previously notched in accordance with their axis of cylindricity, can immediately be inserted in their correct positions in the frame by a practised operative who need not of necessity be a skilled optician.

What I claim is:—

1. Apparatus for indenting spectacle frames comprising a bed plate, means for holding thereon a spectacle frame to be indented, an indenting device rotatably mounted above said spectacle frame, means for rotating said indenting device through a prescribed angle and then firmly holding it in position, means for indicating the amount of such rotation, and means for actuating said indenting device to indent the spectacle frame when thus firmly held.

2. Apparatus for indenting spectacle frames comprising a bed plate, a spectacle frame support thereon, manually controlled means for holding on said support a spectacle frame to be indented, an indenting device rotatably mounted above said spectacle frame, means for rotating said indenting device through a prescribed angle, means for indicating amount of such rotation, and means for depressing said indenting device to effect indentation of the spectacle frame.

3. Apparatus for indenting spectacle frames comprising a bed plate, means for holding thereon a lens frame to be indented, a standard carried by said bed plate, an actuating lever pivotally mounted on the upper end of said standard, a non-rotatable sliding rod pivotally connected with said lever, an arm carried by said standard and serving as a guide for said sliding rod, a goniometrical scale carried by said rod, a sleeve rotatably mounted on said rod, and furnished with an index mark movable over said scale, and an indenting device carried by the lower end of said sleeve in proximity to said spectacle frame.

Signed at London, England, this 17th day of December, 1919.

JOHN HAMER SUTCLIFFE.